United States Patent

[11] 3,593,128

[72] Inventor William D. Perry
Longview, Wash.
[21] Appl. No. 826,569
[22] Filed May 21, 1969
[45] Patented July 13, 1971
[73] Assignee Weyerhaeuser Company
Tacoma, Wash.

[54] MOISTURE-CONTENT-MEASURING SYSTEM EMPLOYING A SEPARATE BRIDGE CIRCUIT FOR EACH SENSING ELECTRODE THEREOF
10 Claims, 7 Drawing Figs.
[52] U.S. Cl. .................................................. 324/61
[51] Int. Cl. .................................................. G01r 27/26
[50] Field of Search .................................... 324/60, 61

[56] References Cited
UNITED STATES PATENTS
3,039,051 6/1962 Locher .................... 324/61
3,339,137 8/1967 Perry ....................... 324/61
3,430,140 2/1969 Preikschat et al. ....... 324/61

Primary Examiner—Edward E. Kubasiewicz
Attorney—Christensen, Sanborn & Matthews

ABSTRACT: The application discloses a moisture-content-measuring system utilizing shielded electrodes arranged in pairs on opposite sides of the material and wherein adjacent pairs of electrodes are energized in an out-of-phase relationship. Each electrode in each pair constitutes a portion of an individual bridge circuit with the arrangement being such that an output signal proportional to the moisture content of the material is derived from each electrode. The signals from each pair of electrodes are then combined and used in an overall system arrangement for determining moisture content. The effects of long cable runs and associated undesirable capacitance effects are avoided through the use of the system disclosed.

INVENTOR.
WILLIAM D. PERRY
BY
Christensen Sanborn & Matthews
ATTORNEYS

INVENTOR.
WILLIAM D. PERRY
BY Christensen Sanborn & Matthews
ATTORNEYS

MOISTURE-CONTENT-MEASURING SYSTEM EMPLOYING A SEPARATE BRIDGE CIRCUIT FOR EACH SENSING ELECTRODE THEREOF

Various systems have been proposed and actually placed in operation for measuring the moisture content of wood. My previously issued U.S. Pats. Nos. 3,354,388 and 3,339,137 each relate to moisture-content-measuring systems and methods. The last-mentioned patent discloses the apparatus for energizing adjacent electrode pairs in an out-of-phase relationship in a manner such that a ground potential midway between the heads is established. The capacitive coupling of input signals via the electrodes to the wood in that system makes possible an effective moisture-content-sensing system wherein the electrode-to-wood capacitance and the resistance and capacitance effects of the wood form part of a balanced bridge sensing circuit.

While the above and other arrangements have been found to work well, the long lead lengths required for the application of input signals to the heads and the derivation of signal information therefrom leads to various problems due to stray capacitance. Generally a relatively expensive coaxial cable is required between the bridge circuits and the measuring heads in order to reduce capacitance effects, and even then the problem is not completely overcome. Zero-point drift due to temperature changes has also been noted.

It is therefore an object of the present invention to provide an improved moisture-content-measuring system which is particularly adapted for use in the lumber industry.

Another object of the present invention is to provide a moisture-content-measuring system utilizing a plurality of adjacent pairs of sensing heads with a separate bridge circuit for each sensing head and wherein the bridge circuits are physically located immediately adjacent or inside the associated sensing head.

Another object of the present invention is to provide a moisture-content-measuring system having a plurality of bridge circuits, each of which is associated with a separate sensing head, and wherein DC output signals are obtained.

A further object of the present invention is to provide an improved moisture meter for lumber wherein the number of adjustments necessary for routine operation of the meter is reduced by comparison to prior art systems.

In the system of the present invention pairs of electrodes are connected with a signal source in an arrangement such that alternate pairs of the electrode assemblies are 180° out of phase with respect to the adjacent electrodes. Each sensing electrode is disposed within a conductive shield in order to avoid the effects of stray capacitance and signal pickup, with the individual pairs of electrodes being oriented with one electrode on one side of the material whose moisture content is being measured and the other electrode of the pair being located on the opposite side of the material. Each electrode and its associated shield is referred to as a sensing head, and in accordance with the teachings of the present invention the components of a bridge circuit are physically located immediately adjacent or inside each sensing head. The electrode in each sensing head is part of the bridge sensing circuit associated therewith.

Instead of forming the bridge circuit utilizing each electrode in the pair, as has been done in the art, the present system provides an arrangement wherein the pairs of electrodes need not be interconnected by a lead which forms part of a bridge circuit. Thus stray signal pickup and capacitance effects are avoided and also the arrangement lends itself well to providing DC output signals. This in turn permits zero adjustment of the amplifiers instead of adjustments being made in the bridge circuitry and also permits the operation of a system wherein the oscillator and amplifiers can be initially adjusted for desired operation and then thereafter no further adjustment is necessary.

The novel features of the present invention will be more clearly understood from the following description when read with reference to the accompanying drawings.

Figure 1:
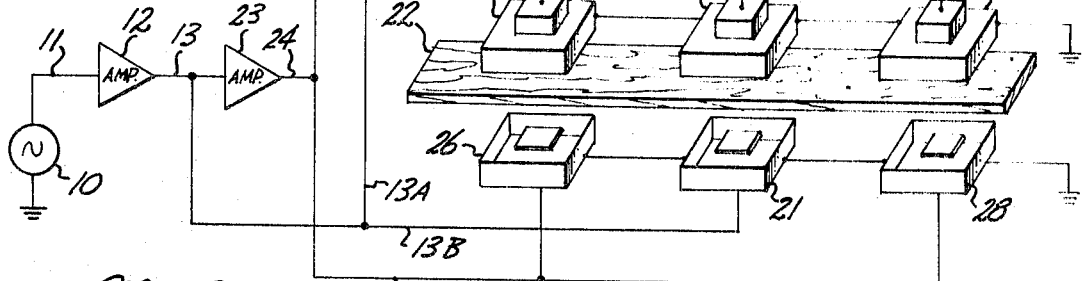
FIG. 1 is a diagrammatic illustration of one preferred embodiment of the invention showing a plurality of sensing-head assemblies driven in an out-of-phase relationship and including individual bridge circuits associated with each sensing head and physically located on the sensing-head assemblies.
Figure 2:
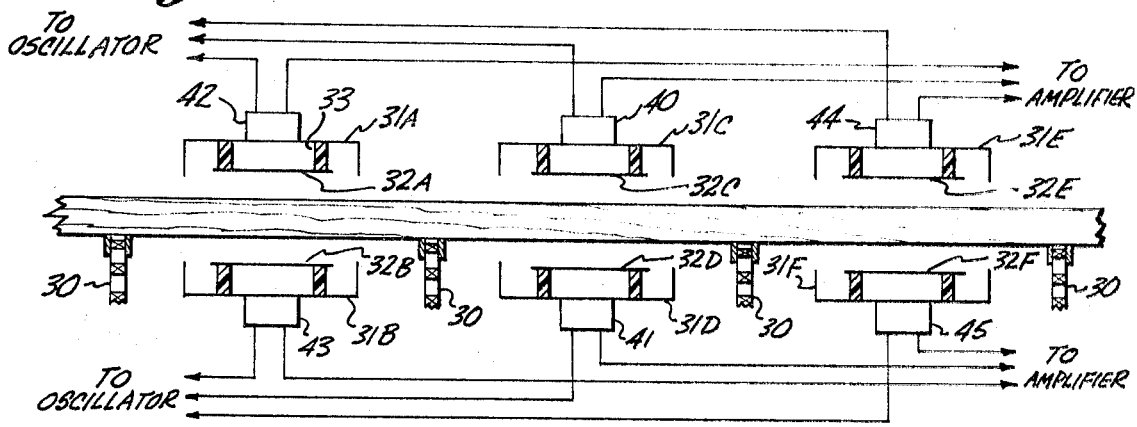
FIG. 2 is a diagrammatic illustration of the orientation of the sensing heads of FIG. 1 relative to a piece of wood and the conveyor chain assemblies associated therewith for moving the wood between the pairs of sensing heads.

Referring now to the drawings and in particular to FIGS. 1 and 2, there is illustrated a system including an alternating signal generator 10 having its output circuit 11 connected to the amplifier 12. The output circuit 13 of the amplifier 12 has branch circuits 13A and 13B which are respectively connected to the sensing heads 20 and 21 located on opposite sides of the piece of wood 22. A unit gain-inverting amplifier 23 coupled with the output circuit of amplifier 12 has its output circuit 24 connected by leads 24A and 24B to the sensing-head assemblies 25 and 26 shown on the left of the center head assemblies 20 and 21 and also to the sensing-head assemblies 27 and 28 located on the right-hand side of the center pair of sensing-heads. The conveyor chain assemblies 30 support the material for movement between the sensing-head assemblies.

As seen most clearly in FIG. 2, each sensing-head includes an outer conductive shield member 31A, 31B, 31C, 31D, 31E and 31F, and a centrally located conductive plate 32A—32F. The plates 32A—32F are referred to as sensing electrodes or plates and are electrically insulated from the associated shield 31A—31F by being supported on the insulating members 33 extending from the shield members. The physical construction of the head assemblies as well as the components described thus far can conveniently correspond to the apparatus illustrated in my previously issued U.S. Pat. No. 3,339,137. However in addition to the apparatus shown in that patent and as described thus far herein, it will be seen that the system of the present invention includes individual electronic bridge circuits contained in the housing members 40, 41, 42, 43, 44, and 45 which are respectively associated with the individual sensing-head units 20, 21, 25, 26, 27, and 28. The details of the individual bridge circuits contained within the housing members 40—45 are described hereinafter. While the bridge circuit housing members are illustrated in FIGS. 1 and 2 as secured to the outer surface of the associated shield, it has been found that the bridge circuits can be placed inside the shields for added protection.

Figure 3:
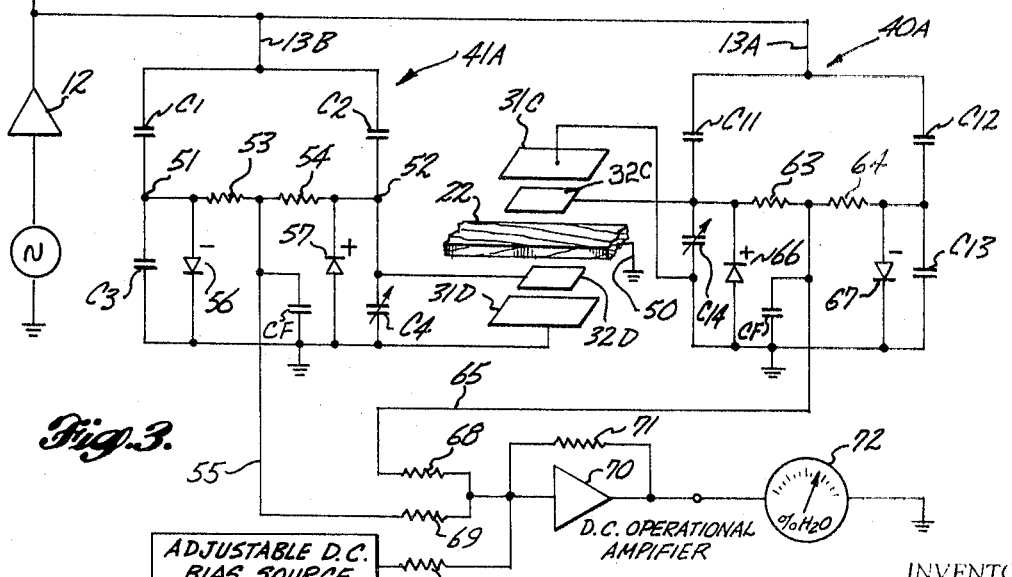
FIG. 3 is a circuit diagram of one preferred embodiment of the bridge circuits associated with each of the sensing heads in one of the pairs of head assemblies in the system of FIG. 1, together with the output circuitry associated therewith.

Turning now to FIG. 3 the circuit details of one preferred embodiment of the bridge circuits associated with the sensing heads 20 and 21 will be described. Therein it will be seen that the lead 13A from the amplifier 12 provides input signals to the bridge circuit 40A contained within the housing 40 of FIG. 2 and the circuit 13B provides signals to the bridge circuit 41A housed within the member 41 of FIG. 2. For purpose of illustration the shields 31C and 31D together with the sensing electrodes 32C and 32D of FIG. 2 are shown diagrammatically in FIG. 3.

The bridge circuit 41A includes the capacitors C1, C2, and C3 (each of which are of approximately the same value) together with the variable capacitor C4. The sensing electrode 32D is connected in parallel circuit arrangement with capacitor C4 via the shield electrode shown at 31D and also via the wood 22. The wood 22 is illustrated as being electrically grounded via the conductor 50. In practice the wood can be grounded via the drive chain assemblies or, as explained in my previously issued U.S. Pat. No. 3,339,137, the energization of the adjacent pairs of electrodes in an out-of-phase mode gives rise to an effective ground potential between the adjacent pairs of electrode assemblies. The shield 31D is shown as being electrically grounded.

As is conventional in the case of bridge circuits, it is desired to monitor the potential difference between the points 51 and 52 in the bridge circuit. Thus relatively high impedance elements illustrated as resistors 53 and 54 interconnect the bridge points 51 and 52. The output circuit lead 55 is connected to the midpoint of the resistors 53 and 54. A filter capacitor $C_F$ connected to output lead 55 and signal ground is included in the circuit of FIG. 3. The diodes 56 and 57 connected in reverse polarity between points 51 and 52 of the bridge circuit and signal ground serve to rectify the output signals applied via lead 55 to a suitable amplifier for operating an indicator.

The bridge circuit 40A is substantially identical to the bridge circuit 41A. Thus it includes the capacitors C11, C12, and C13, the variable capacitor C14, resistors 63 and 64, diodes 66 and 67, and the filter capacitor $C_F$. The upper sensing electrode 32C is connected in the bridge circuit 40A in the same manner as indicated for the lower electrode 32D.

The output circuit lead 55 and 65 are connected via the input resistors 68 and 69 to a conventional DC operational amplifier 70. The usual feedback resistor 71 connects the output circuit of the operational amplifier to its input circuit. The output circuit of the amplifier will be seen to be connected to the moisture-indicating meter 72. An adjustable DC bias source 73 may be coupled to the amplifier input via resistor 74 to permit convenient zero adjustment of the meter. It is of importance to note in FIG. 3 that the input leads 13B and 13A and the output leads 55 and 65 form no part of the bridge circuit and thus the capacity to ground of these leads forms no part of the bridge circuit. Thus they do not affect sensitivity of the system nor the zero drift as has been the case in prior art devices.

Figure 4:
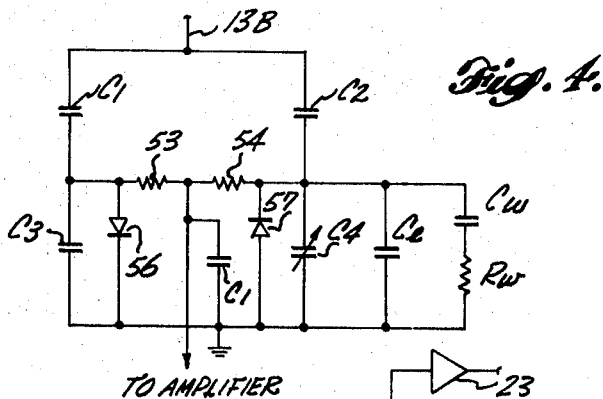
FIG. 4 is a circuit diagram corresponding to one of the bridge circuits in FIG. 3 but showing the equivalent circuit for the sensing electrode and the wood.

It will be noted in the embodiment of FIG. 3 that a single-ended amplifier is utilized with the composite signals of the upper and lower heads in a given pair being applied to the amplifier. FIG. 4 shows the effective circuit diagram for the bridge circuit 41A of FIG. 3 with the capacitance of the electrode 32D being shown as $C_e$ and the resistance and capacitance of the wood as $C_w$ and $R_w$.

Figure 5:
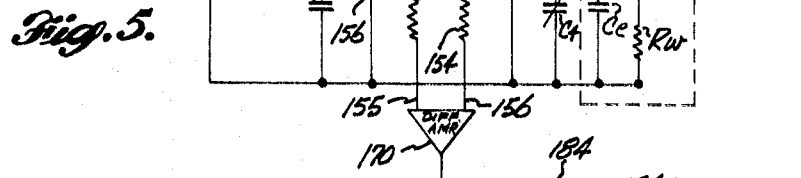
FIG. 5 is a circuit diagram of a further embodiment of the individual bridge circuits associated with each of the heads.

In FIG. 5 there is illustrated an alternate embodiment of the bridge circuitry adapted for use in the system of the present invention. Bridge circuits 141A and 140A are respectively associated with the head assemblies 20 and 21 and will be seen to correspond in general to the bridge circuits illustrated in FIG. 3. That is, bridge circuit 141A includes capacitors C1, C2, C3 and C4 connected in a bridge circuit arrangement with the capacitance of the electrode 32D being shown as capacitance $C_e$ and the resistance and capacitance of the wood shown as $C_w$ and $R_w$. Diodes 156 and 157 serve to rectify the output signals derived from points 151 and 152 in the bridge circuit via resistors 152 and 154. The output leads from the bridge circuit 141A are shown as the leads 155 and 156 which go to the differential amplifier 170.

The bridge circuit for the head assembly 20 of FIGS. 1 and 2 is shown diagrammatically as bridge circuit 140A and corresponds to the details of the bridge circuit 141A of FIG. 5. Thus it has its output circuits 165 and 166 connected to the same differential amplifier 170.

While the specific values for the individual components shown in the bridge circuits can vary, it should be mentioned that in one system using the concepts shown in FIG. 5 capacitors C1, C2, and C3 were each 150 piccofarads and C4 was 120 piccofarads. Resistors 153 and 154 were each 10 megohms.

Figure 6:
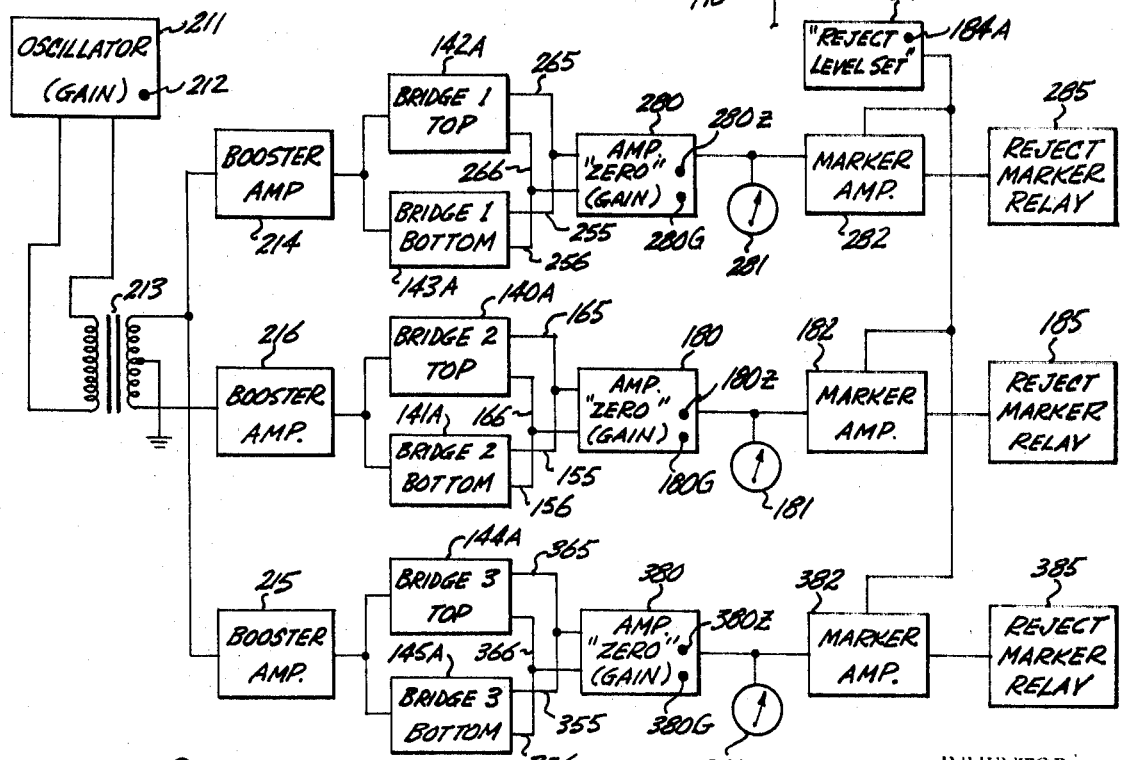
FIG. 6 is a block diagram of a composite system provided in accordance with the teachings of the present invention.

In FIG. 6 an overall system for the three pairs of head assemblies such as shown in FIG. 1 is illustrated. The system of FIG. 6 makes use of the differential amplifier arrangement of FIG. 5 and also uses an alternate arrangement for energization of the heads. Thus an oscillator 211 having a gain control 212 provides output signals to the output transformer 213. The secondary winding of the transformer 213 is center tapped so that the booster amplifiers 214 and 215 receive signals of the same phase while the booster amplifier 216 receives signals which are 180° out of phase with respect to amplifiers 214 and 215.

The booster amplifier 216 is connected to the bridge circuits 140A and 141A which are respectively housed within the circuit housing members 40 and 41 for the upper and lower head assemblies 20 and 21. In a similar manner the booster amplifiers 214 and 215 respectively energize the bridge circuits 142A and 143A and the bridge circuits 144A and 145A. Each of the bridge circuits would correspond to the bridge circuit 141A shown in detail in FIG. 5.

The output circuits 155 and 156 from the lower bridge circuit 141A are respectively coupled to the output circuits 165 and 166 of the top bridge circuit 140A so that composite signals are applied to the amplifier 180. The amplifier 180 is shown as having a zero adjustment control 180Z and a gain adjustment control 180G.

In a similar manner the output circuits 255 and 256 for the lower bridge circuit 143A associated with the sensing head 26 are coupled with the output circuits 265 and 266 of the bridge circuit 142A associated with the sensing head 25 with composite signals being applied to the amplifier 280 having the zero and gain adjustments 280Z and 280G. Output circuits 355 and 356 for the bridge circuit 145A associated with sensing head 28 are coupled with the output circuits 365 and 366 from the bridge circuit 144A associated with the sensing head 27 to provide composite signals to the amplifier 380 having zero and gain adjustment controls 380Z and 380G. The amplifiers 180, 280, and 380 are coupled with the indicating meters 181, 281, and 381 and also to the marker amplifiers 182, 282, and 382. The marker amplifiers are adjusted by the reject level set circuit 184 having the control adjustment 184A associated therewith. Each marker amplifier is in turn coupled with an associated reject marker relay 185, 285, and 385 for marking the lumber in the manner described in my above-referred to U.S. patent.

An important aspect of the system of FIG. 6 is that once the system has been established and the various gain controls for the oscillator and amplifiers have been set no further adjustments are required. This is primarily due to the circuit arrangement wherein the various signal leads form no part of the bridge circuits. It will be seen that the system of FIG. 6 has only four operating adjustments which are shown as the zero adjustments for the amplifiers 180, 280, and 380 together with the reject level set established by the control 184A. It is found in practice that the use of solid-state circuitry in the oscillator and amplifiers results in a system which is so stable that after initial installation no further adjustment is necessary.

The amplifiers shown in the system of FIG. 6 should have a relatively high input impedance, with the booster amplifiers providing not only isolation between the oscillator and the bridge circuits together with the necessary signal strength for the bridges, but also serving to prevent failure of the entire system if a short circuit condition should develop in one of the bridge circuits.

Figure 7:
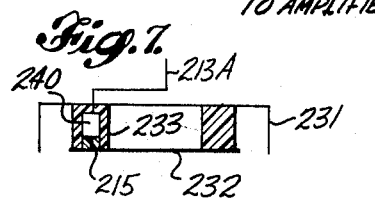
FIG. 7 shows a preferred mounting for the bridge circuits.

Since the system of the present invention is typically used under adverse environmental conditions, it is important to provide proper protection for the components. In FIG. 7 the insulator 233 which supports the sensing electrode 232 has a hollow center portion for housing the bridge circuit 240 therein. One portion of the insulation member is removable for insertion of the bridge circuit. Input lead 213A provides power to the bridge circuit and lead 215 connects the sensing electrode to the bridge circuit. Thus the bridge circuit is housed inside the shield 231.

While the invention has been disclosed by reference to the presently preferred embodiments, it will be recognized that certain changes can be made without deviating from the inventive concepts.

What I claim is:

1. A system for providing output signals which are proportional to the moisture in a selected material comprising in combination: at least one pair of sensing electrodes including first and second electrodes positioned opposite each other to define a region therebetween through which the material passes; first signal means producing a first alternating signal, means coupling said first alternating signal to each of said electrodes so that the potential thereof at any instant has the same magnitude and polarity; and monitoring circuit means including first and second capacitance bridge circuits, each including a plurality of legs, means connecting said first electrode in one leg of said first capacitance bridge circuit, means connecting said second electrode in one leg of said second capacitance bridge circuit, means positioning said first capacitance bridge circuit adjacent said first sensing electrode, and means positioning said second capacitance bridge circuit adjacent said second sensing electrode.

2. The system as defined in claim 1 including a second pair of sensing electrodes having third and fourth electrodes positioned opposite each other and respectively adjacent said first and second electrodes; second signal means producing a second alternating signal which is 180° out of phase relative to said first signal, means coupling said second alternating signal to each of said third and fourth electrodes so that the potential thereof at any instant has the same magnitude and polarity; and said monitoring means further including third and fourth capacitance bridge circuits, each including a plurality of legs, means connecting said third electrode in one leg of said third capacitance bridge circuit, means connecting said fourth electrode in one leg of said fourth capacitance bridge circuit, means positioning said third capacitance bridge circuit adjacent said third electrode, and means positioning said fourth capacitance bridge circuit adjacent said fourth electrode.

3. The system as defined in claim 2 including first, second, third and fourth shield electrode means, means situating each of said shield electrode means respectively adjacent to and partially enclosing one of said first, second, third and fourth electrodes; and means connected to each of said shield electrode means for supporting a different one of said bridge circuits.

4. The system of claim 3 wherein each of said supporting means maintains its bridge circuit between its shield electrode and its sensing electrode.

5. The system of claim 2 wherein each of said bridge circuits includes a signal-rectifying circuit coupled to the legs thereof for providing unidirectional output signals from the associated bridge circuit.

6. The system of claim 5 including amplifier means coupled with said first and second bridge circuits for adding the output signals therefrom, and second amplifier means coupled with said third and fourth bridge circuits for adding the output signals therefrom.

7. The system of claim 3 wherein said situating means comprises a plurality of insulating members supporting said sensing electrodes inside said shield electrode means, and wherein each of said bridge circuits is positioned inside a different one of said insulating members.

8. A moisture-sensing system comprising in combination; first and second pairs of sensing electrodes, said first pair including first and second electrodes and said second pair including third and fourth electrodes, said first and third electrodes being maintained adjacent each other and disposed opposite said second and fourth electrodes to define a space for the positioning of material between the first and second and between the third and fourth electrodes; first, second, third and fourth capacitance bridge circuits each including a plurality of legs, means connecting said first, second, third and fourth electrodes in one leg, respectively, of said first, second, third and fourth capacitance bridge circuits, means positioning said first, second, third and fourth capacitance bridge circuits adjacent, respectively, said first, second, third and fourth electrodes, each of said capacitance bridge circuits providing an output signal when energized, which output signals are dependent on the moisture content of the material located in said space; signal means providing first and second alternating signals which are 180° out of phase with respect to each other; means coupling said first signal to said first and second electrodes and said second signal to said third and fourth electrodes; first amplifier means coupled with said first and second bridge circuits for providing output signals proportional to the sum of the output signals from said first and second bridge circuits; and second amplifier means coupled with said third and fourth bridge circuits and providing output signals proportional to the sum of the output signals from said third and fourth bridge circuits.

9. A moisture sensing system as defined in claim 8 including a plurality of shield electrodes, means positioning each of said shield electrodes adjacent to and partially enclosing one of said sensing electrodes, and means connected to each of said shield electrodes supporting one of said capacitance of bridge circuits between said shield electrode and its sensing electrode each of said bridge circuits is physically located inside a different one of said shield electrodes.

10 A moisture-sensing system as defined in claim 9 wherein said supporting means includes electrical insulation means supporting each of said sensing electrodes inside a different one of said shield electrodes, and wherein each of said bridge circuits is located inside one of the insulating members which supports the associated sensing electrode.

UNITED STATES PATENT OFFICE
CERTIFICATE OF CORRECTION

Patent No. 3,593,128           Dated July 27, 1971

Inventor(s) WILLIAM D. PERRY

It is certified that error appears in the above-identified patent and that said Letters Patent are hereby corrected as shown below:

Claim 9, delete lines 7 and 8.

Signed and sealed this 7th day of December 1971.

(SEAL)
Attest:

EDWARD M. FLETCHER, JR.          ROBERT GOTTSCHALK
Attesting Officer                 Acting Commissioner of Patents